United States Patent [19]

Klaussner

[11] 4,354,147

[45] Oct. 12, 1982

[54] DRIVE AND CONTROL ARRANGEMENT FOR A MECHANICAL ECCENTRIC PRESS

[76] Inventor: Hans-Jürgen Klaussner, Strehlgasse 24, CH-8472, Seuzach, Switzerland

[21] Appl. No.: 178,448

[22] Filed: Aug. 15, 1980

[51] Int. Cl.³ .............................................. H02P 3/12
[52] U.S. Cl. .................................. 318/363; 318/375; 318/447; 318/466
[58] Field of Search ............... 318/375, 466, 447, 470, 318/363; 100/53; 192/142 R

[56] References Cited

U.S. PATENT DOCUMENTS

| | | | |
|---|---|---|---|
| 2,535,183 | 12/1950 | Wilson | 318/375 |
| 2,560,288 | 7/1951 | Harvey et al. | 318/466 |
| 2,790,280 | 4/1957 | Wilson et al. | 318/466 |
| 3,227,255 | 1/1966 | Heiberger | 192/142 R |
| 3,564,376 | 2/1971 | Mais et al. | 318/466 |
| 3,749,005 | 7/1973 | Eineiger et al. | 100/53 |
| 3,832,875 | 9/1974 | Newman | 100/53 |
| 4,037,699 | 7/1977 | Cronen, Jr. | 100/53 |
| 4,289,995 | 9/1981 | Sorber et al. | 318/266 |
| 4,298,114 | 11/1981 | Nagi et al. | 100/53 |

*Primary Examiner*—David Smith, Jr.
*Attorney, Agent, or Firm*—Burns, Doane, Swecker & Mathis

[57] ABSTRACT

A drive and control arrangement for a mechanical eccentric press is disclosed. The arrangement includes a direct current electric motor connected to a reduction gear mechanism. An output shaft of the reduction gear mechanism is coupled to an eccentric such that the eccentric rotates with the shaft about a common axis. A connecting rod of the press is connected to the eccentric for pivotal movement about an axis parallel to and offset from the common axis of the shaft and eccentric. The arrangement includes a limit switch that is operated by a cam element adjustably mounted on the eccentric. An electronic control device is included and has a starter unit for supplying electric current to the motor, and a braking unit for short-circuiting the armature of the motor through a resistance in order to brake the motor and the press. The braking unit is actuated by the limit switch a predetermined period after the connecting rod has moved through its bottom dead center position. A timing device is included to initiate braking of the electric motor and press after a predetermined period when the limit switch fails to interrupt the supply of electric current to the motor or when the connecting rod becomes blocked in the bottom dead center position. The arrangement includes circuit elements which permit the speed of the electric motor to be reduced, and which permit the electric motor and press to be stopped at any point during the press cycle.

5 Claims, 2 Drawing Figures

DRIVE AND CONTROL ARRANGEMENT FOR A MECHANICAL ECCENTRIC PRESS

BACKGROUND OF THE INVENTION

This invention relates generally to mechanical presses, and more particularly to a drive and control arrangement for a mechanical eccentric press.

In conventional mechanical eccentric presses, the pressing force is transmitted to a pressing member by a flywheel that is driven by an alternating current electric motor. The flywheel is mounted on a flywheel shaft, and is connected to the eccentric shaft by a shift and brake coupling. A clutch is used for control.

Conventional eccentric presses exhibit various deficiencies. In particular, the drive systems have poor efficiency, requiring relatively oversized drive elements in order to produce a particular force at the eccentric. Consequently, the volume and weight of such presses are disproportionately great and the stroke cycles long, so that a jerky operation cannot be avoided.

A further disadvantage is that drive elements, such as reducing gear mechanisms and clutches, are subject to great wear. Additionally, actuation of the clutch results not only in disproportionately high clutch wear, but also in overrunning the press.

It is an object of this invention to provide a drive and control arrangement for a mechanical eccentric press which overcomes the above disadvantages.

SUMMARY OF THE INVENTION

According to a preferred embodiment of the present invention, a drive and control arrangement for a mechanical eccentric press includes a direct current electric motor and an eccentric coupled for rotation with a shaft driven by the motor and supported by roller bearings. A connecting rod of the press is connected to the eccentric for pivotal movement about an axis offset from the axis of rotation of the eccentric. A control device controls electric current supplied to the motor, and includes a limit switch for interrupting the supply of current at a selected, adjustable angular position of the drive shaft and eccentric. The limit switch is electrically connected to a timing device.

With the arrangement of the present invention, the torque of the direct current motor can be increased before the connecting rod reaches bottom dead center so that, for a short time, an increased pressing force is achieved without overloading the motor, and switching off or on again of the eccentric press ensures smooth operation.

A further advantage of the drive and control arrangement of the present invention is that neither a clutch, a flywheel or similar device is required. Therefore, wear-free operation of the eccentric press is ensured.

The present arrangement provides for the precise stopping of the press at top dead center taking into consideration motor power, cycle time and brake path, by the selection of the time at which the limit switch is operated during the press cycle.

The present arrangement also provides for the timing device to initiate braking of the motor and press at an adjustable, predetermined point during the press cycle in the event of failure of the limit switch. In a preferred arrangement, the predetermined point is approximately 240° after top dead center. Thus, reliable switching-off of the eccentric press is guaranteed, even on failure of the limit switch or on blocking of the press at bottom dead center.

According to a preferred embodiment of the present invention, the control device includes a braking resistance and means for short-circuiting the armature of the direct current motor through the braking resistance in order to brake the motor and the press. The short-circuiting means can be actuated either by the limit switch or the timing device. Thus, over-run of the direct current motor, which is indefinite with normal switching-off, can be variably shortened so that the connecting rod reaches top dead center in all cases.

In a preferred embodiment of the present arrangement, a starting device is included for controlling the supply of electric current to the motor. The starting device is connected to the short-circuiting means such that the starting device can interrupt the braking process initiated by the operation of the limit switch. The limit switch is arranged to be operated to interrupt or restart the starting device when the position of the driven shaft and eccentric corresponds to a point in the press cycle of approximately 220° after top dead center. This embodiment permits the eccentric press to be operated at a higher number of strokes.

In order to reduce the motor speed in a preferred embodiment of the present invention, the combination of a normally open switch in series with a resistor is connected in parallel with the starting device. When the switch is closed, the voltage reduction caused by the resistor permits crawling speed control of the eccentric press, thus permitting the connecting rod to be stopped in any position.

According to a preferred embodiment of the present invention, an emergency switch device is included for stopping the motor and thus the press at any point during the press cycle.

BRIEF DESCRIPTION OF THE DRAWINGS

The preferred embodiments of the present invention are described with reference to the accompanying drawings wherein like members bear like reference numerals, and wherein.

DESCRIPTION OF THE PREFERRED EMBODIMENTS

Figure 1:
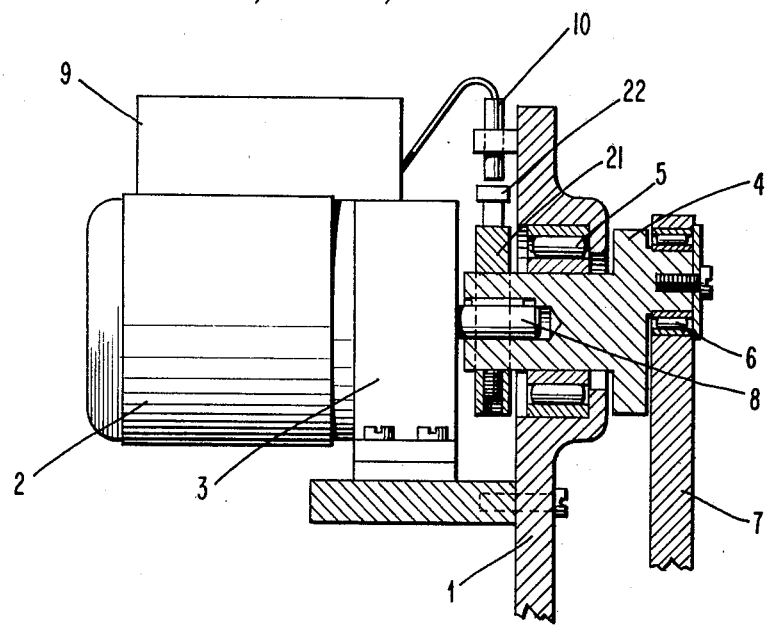
FIG. 1 is a longitudinal section view of a drive and control arrangement for an eccentric press according to the present invention.

Referring to FIG. 1, a drive and control arrangement for a mechanical eccentric press includes a direct current electric motor 2 having a control device 9. The electric motor 2 is connected to a reduction gear mechanism 3 which is preferably a spur gear mechanism. The reduction gear mechanism 3 is mounted on a frame 1. An output shaft 8 of the gear mechanism is non-rotatably coupled to an eccentric 4. The eccentric 4 is mounted on the frame 1 by a roller bearing 5 for rotation about a common axis with the shaft 8. A connecting rod 7 carrying a pressing ram (not illustrated) at its lower end is pivotally connected at its upper end to the eccentric 4 by a roller bearing 6 for rotation relative to the eccentric 4 about an axis parallel to an offset from the common axis of the shaft 8 and the eccentric 4.

A limit switch 10 of the control device 9 is mounted on the frame 1. The limit switch 10 switches off the direct current supplied to the motor 2, preferably after the connecting rod 7 and ram have passed through bottom dead center. An actuating cam 22, carried by an actuating ring 21 mounted on the eccentric 4, serves to operate the limit switch 10.

The characteristics of a direct current motor, in particular its high starting torque, precise braking effect obtained by short-circuiting the armature, and the reduction of speed which can be achieved by reduced voltage, are taken advantage of in the present invention.

During the pressing operation, the connecting rod 7 is moved downward. On reaching bottom dead center the torque of the direct current motor 2 is increased by increasing the intensity of the supply current. The current intensity may for a short time reach twice the nominal current intensity without overloading the direct current motor 2. Precise stopping of the connecting rod 7, for example at the top dead center position, can be guaranteed by short-circuiting the armature of the direct current motor 2 after the connecting rod 7 has passed through bottom dead center. The direct current motor 2 then operates as a generator and consequently the moment of inertia is immediately and automatically braked. The braking distance can be selectively varied to an accuracy of ±1 mm in a known manner by the appropriate choice of a braking resistance connected in series with the armature at the instant during the press cycle at which the limit switch 10 is operated.

By changing the d.c. voltage, various stroke speeds can be achieved. Thus, it is possible to move the connecting rod 7 slowly downward in steps and stop it at any time and, for example, in case of a tool change to optimally balance the relationship between the press, the pressing ram and the die. Crawling speed control of the direct current motor 2 and hence the connecting rod 7, induced by the use of low voltage, allows movement of the connecting rod in stages, wherein the connecting rod 7 can be stopped in any position. Direct current motors with permanent magnets or field windings, direct current disc-type rotor motors and so forth may be used with a voltage of 70 to 380 V, preferably 180 to 220 V.

Figure 2:
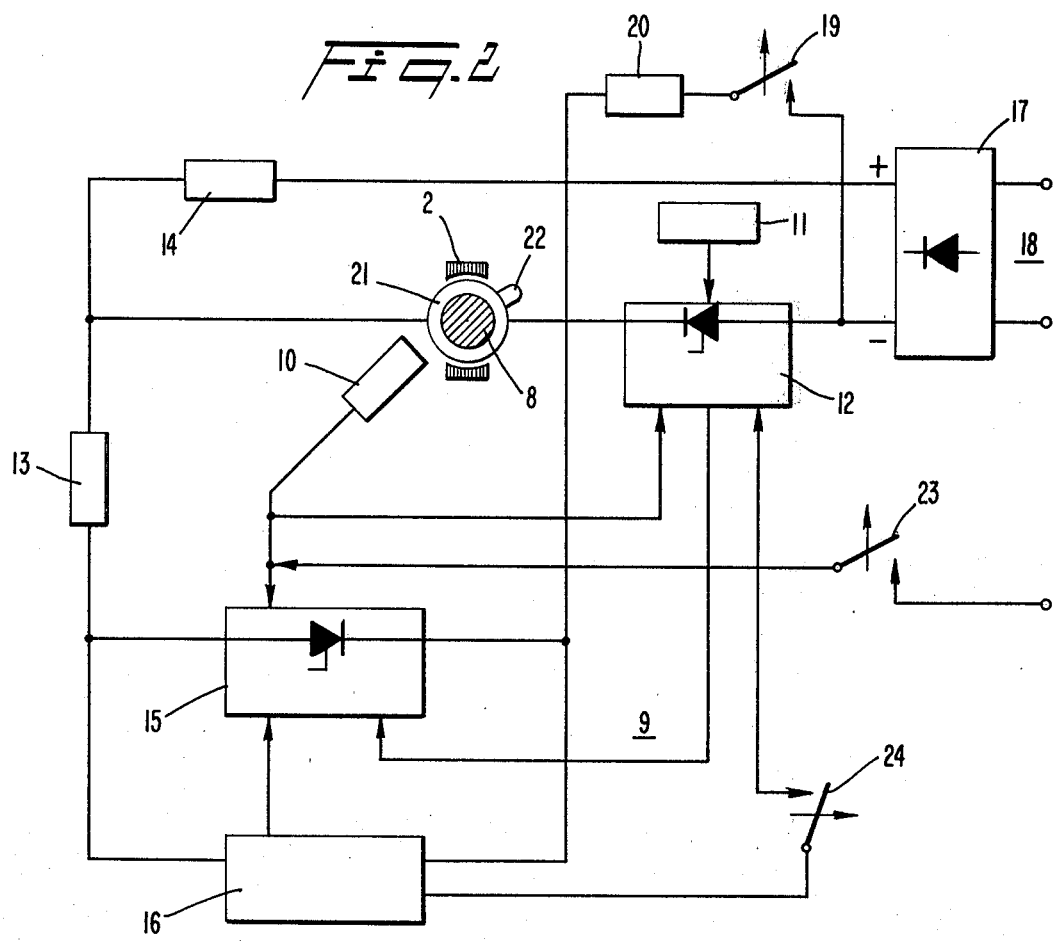
FIG. 2 is a schematic diagram of a control device according to the present invention.

Referring to FIG. 2, the armature of direct current motor 2 is connected by a rectifier 17 to an alternating current source 18. Between the negative terminal of the rectifier 17 and the motor armature is connected a starting logic unit 12 having a starter 11 connected to its input. A resistor 14 is connected in series between the armature and the positive terminal of the rectifier 17. The starting logic unit 12 is electrically connected to the limit switch 10 and to a braking logic unit 15. The braking logic unit 15 is connected in series with a braking resistance 13, and the series combination is connected across the armature of the motor 2. Connected in parallel with the braking logic unit 15 is a timing device 16 which is also connected to the starting logic unit 12 through a manual switch 24. The limit switch 10 is connected both to the braking logic unit 15 and to the starting logic unit 12. A normally open switch 19 is connected in series with a resistance 20, and the series combination is connected in parallel with the starting logic unit 12. By closing the switch 19 a reduction in motor speed and hence, as already described, crawling speed control of the connecting rod 7 can be obtained.

Parallel to the limit switch 10 is connected an emergency switch device 23 for switching-off the motor 2 in any position of the connecting rod 7.

Switching-on of the motor 2 and hence the eccentric press is carried out by the starter 11 acting on the starting logic unit 12, preferably by a pedal switch, a manual key, an actuation sensor such as a proximity switch, a photoelectric cell or similar device, or by pulse control of machines on the supply side. The starting signals can be fed to the starting logic unit 12 as individual pulses or as continuous signals. The starting logic unit 12 is programmed such that after each starting signal the unit must be turned off by the limit switch 10, and such that a continuously applied starting signal supplied from the starter 11 must be interrupted before the direct current motor 2 can be started again by the starting unit 12.

Switching-on of the direct current motor 2 preferably takes place with a low voltage signal, for example 24 V, fed to a semiconductor power switch, for example a thyristor, transistor, triac or similar device. A continuous signal from the starter 11 to the starting logic unit 12 could be interrupted for a short time by the limit switch 10 via an electrical connection (not illustrated) so that the eccentric press operates continuously.

The limit switch 10 is fixedly connected to the machine frame 1 and is actuated by the cam 22 carried on the actuating ring 21. The actuating ring 21 is adjustable on the driven shaft 8 and is preferably adjusted such that the limit switch 10 is actuated after the connecting rod 7 has passed through bottom dead center, for example at an angle for the eccentric 4 of approximately 220° from its top dead center position.

After each switching-on of the starter 11, the braking circuit, which consists of the braking resistance 13 and the braking logic unit 15, is interrupted by a signal emitted from the starting logic unit 12 to the braking logic unit 15. The braking circuit is interrupted in such a manner that after each starting signal the shaft 8 is always driven until the limit switch 10 is operated. The limit switch 10, which is preferably an electronic proximity switch, switches on the braking circuit and also switches off the starting logic unit 12.

The braking logic unit 15 includes a semiconductor power switch which is turned on by a low voltage signal in order to short-circuit the armature of the electric motor 2 through the resistance 13 so that the motor 2 and hence the press are braked. The kinetic energy is dissipated by the braking resistance 13.

Connected in parallel with the braking logic unit 15 is the timing device 16. The timing device 16 switches on the braking circuit after an adjustable, preset period. However, the timing device only initiates the braking process when the limit switch 10 fails or when the eccentric press is blocked at bottom dead center. The timing device 16 is set so that the braking process is initiated after passage of the driven shaft 8 through between 190° and 300° from the top dead center position, and preferably through 240° from the top dead center position. There is no signal emitted automatically from the timing device 16 to the starting logic unit 12 so that the direct current motor 2 is not restarted after operation of the timing device 16. Such a fault in the operation is indicated optically and the eccentric press must be restarted by closing switch 24 manually in order to provide a signal to the starting logic unit 12 from the timing device 16.

The output of an eccentric press according to the present invention, compared with conventional eccentric presses, can be doubled to quadrupled with very short stroke times of up to 0.1 seconds. The press is suitable for use in stamping, pressing, riveting, separating and similar operations.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Moreover, variations and changes may be made by those skilled in the art without departing from the spirit of the present invention.

What is claimed is:

1. In a mechanical eccentric press including a ram which is moved between a top dead center position and a bottom dead center position by means of a d.c. electric motor having a drive shaft that is connected to the ram by an eccentric mechanism and a connecting rod, and means for automatically deactivating the motor as a function of the angular position of its shaft after the ram has reached bottom dead center, a device for actuating and controlling the motor, comprising:

a limit switch that is adjustably positioned on said shaft so as to be actuated at an adjustable point during the rotation of said shaft after the ram reaches bottom dead center;

a braking sequence circuit that is operable to short-circuit the armature of the motor through a braking resistance upon actuation of said limit switch, to thereby brake the motor; and a starting sequence circuit for automatically interrupting a braking operation performed by said braking sequence circuit a predetermined time period after actuation of said limit switch.

2. The device of claim 1 wherein said starting sequence circuit interrupts a braking operation in response to either passage of said time period after actuation of said limit switch or actuation of an independently actuated starter.

3. The device of claim 1 wherein said limit switch is actuated when said shaft rotates approximately 220° after the top dead center position of the ram.

4. The device of claims 1, 2 or 3 further including a timing circuit responsive to said limit switch for actuating said braking sequence circuit at a predetermined point after said limit switch is actuated if said braking sequence circuit does not operate in response to actuation of said limit switch.

5. The device of claim 4 wherein said predetermined point occurs when said shaft has rotated approximately 240° after the top dead center position of the ram.

* * * * *